United States Patent
Westphal

(10) Patent No.: US 11,049,155 B2
(45) Date of Patent: Jun. 29, 2021

(54) SYSTEM AND METHOD FOR DISPLAYING, SEARCHING, AND INTERACTING WITH A TWO DIMENSIONAL PRODUCT CATALOG

(75) Inventor: Geoffry A. Westphal, Evanston, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 1027 days.

(21) Appl. No.: 12/421,903

(22) Filed: Apr. 10, 2009

(65) Prior Publication Data
US 2010/0262514 A1 Oct. 14, 2010

(51) Int. Cl.
*G06Q 30/06* (2012.01)
*G06F 16/951* (2019.01)

(52) U.S. Cl.
CPC ....... *G06Q 30/0601* (2013.01); *G06F 16/951* (2019.01); *G06Q 30/0603* (2013.01)

(58) Field of Classification Search
CPC .................................. G06Q 30/0207–0277
USPC .................. 705/27, 343, 27.2, 28–29, 27.1; 707/740–746
See application file for complete search history.

(56) References Cited

U.S. PATENT DOCUMENTS

| | | | | |
|---|---|---|---|---|
| 8,121,902 B1* | 2/2012 | Desjardins | ......... | G06Q 30/0601 705/26.1 |
| 8,296,291 B1* | 10/2012 | Desjardins | ......... | G06Q 30/0603 705/27.2 |
| 2005/0091127 A1* | 4/2005 | Saltel | ..................... | G06Q 30/06 705/26.8 |
| 2008/0109327 A1* | 5/2008 | Mayle | ................ | G06Q 30/0603 705/27.1 |
| 2009/0254455 A1* | 10/2009 | Rothey | .............. | G06Q 30/0601 705/26.1 |

OTHER PUBLICATIONS

White, Ron, "How Computers Work", Millennium Ed., Que Corporation, Indianapolis, IN, 1999.*

* cited by examiner

Primary Examiner — Chrystina E Zelaskiewicz
(74) Attorney, Agent, or Firm — Greenberg Traurig, LLP

(57) ABSTRACT

A system and method for use in presenting information relevant to a product catalog. The system receives a search request and presents to a user in a two-dimensional format a plurality of iconic images each representative of a page of a product catalog. Each of the iconic images is activatable to cause a display of an image of the page of the product catalog represented by the iconic image. One or more of the presented plurality of iconic images that are linked to a page of the product catalog having a product responsive to the search request are highlighted to the user.

8 Claims, 19 Drawing Sheets

SYSTEM AND METHOD FOR DISPLAYING, SEARCHING, AND INTERACTING WITH A TWO DIMENSIONAL PRODUCT CATALOG

BACKGROUND

There are numerous websites that allow users to view, search, and interact with online information, including online product catalogs. By way of example, prior art FIG. 2 is a screen shot from amazon.com which illustrates search engine results being returned to a user and presented to the user using a "vertical" format, i.e., the search results are displayed using a single column 200 of textual links and descriptions. Presenting search engine search results to a user using such a "vertical" format is generally standard practice in the area of online searching and online retailing.

Recognizing that search results are often times large and disparate, contextual search engines are often used to further assist users in locating "relevant" information. Contextual search engines generally function to rank listings of search results based upon a perceived context of a search. Web sites employing contextual search engines may also function to provide users with additional information, such as images, videos, maps, etc., that is similarly perceived to be contextually related to a search query. By way of example, prior art FIG. 3 is a screen shot from yahoo.com India which illustrates a contextual search engine providing to a user contextual search results in response to the user submitting to the search engine the keyword "Taj Mahal." For some users, web sites that employ contextual search engines have become the information portals of choice when a user is looking to obtain aggregated information that the user believes will be contextually related to a search query.

As an alternative to providing search results to a user using a conventional, "vertical" format, some web sites have been seen to present search results using a "surfaced cartographic" format. An example of such a web site is kartoo.com. By way of example, prior art FIGS. 4 and 5 are screen shots from kartoo.com where FIG. 4 illustrates search results obtained in response to a search using the keyword "coffee" while FIG. 5 illustrates search results obtained in response to a search using the keyword "golf." As will be appreciated from the exemplary search results shown in FIGS. 4 and 5, while the approach utilized by kartoo.com may generally help a user visualize the results of a search request across various nodes of a network, the search result cartographic maps provided by kartoo.com are too varied to be useful in an environment wherein a user is intended to search structured content such as a product catalog.

To allow a user to navigate structured content such as a product catalog, some web sites provide a user with the ability to perform parametric, drill-down searching in addition to free-form searching. Using such searching functionality, a user may consider concepts associated with one or more of product features or attributes, product model numbers, product categories, etc. to locate products of interest. While the results returned in response to using such free-form and/or drill-down product searching concepts are still typically presented to a user using the aforementioned "vertical" manner of providing search results, in some instances search results are also returned to a user in the form of links to the one or more relevant pages from an electronic version of a product catalog, i.e., links are provided to those catalog page(s) having further information with respect to the product the user is searching for. An example of such a search result is seen in the screen shot of prior art FIG. 6.

SUMMARY

The following generally describes a system and method for displaying, searching, and interacting with a two dimensional, electronic version of a product catalog. As will become apparent from the description that follows, the subject system and method provides a navigation system that leverages in two dimensions aspects that come from the visceral experience one has with a real paper catalog. In this manner, the subject system and method helps users create mental maps to thereby improve the product searching experience. Specifically, the subject system and method functions to create and clearly emphasize logical and physical contexts related to product searches. Among other advantages, these contexts will help users narrow their search results quickly, help a vendor better merchandise their product offerings, provide for easier and more natural navigation for less technology savvy users customers, and/or allow for a "living" catalog where additional product information and pages can be added dynamically as needed.

By way of example, to present information relevant to a product catalog the system receives a search request, e.g., a click, text entry, voice input, or the like, and presents to a user in a two-dimensional format a plurality of iconic images each representative of a page of a product catalog. Each of the iconic images is activatable to cause a display of an image of the page of the product catalog represented by the iconic image. One or more of the presented plurality of iconic images that are linked to a page of the product catalog having a product responsive to the search request are highlighted to the user.

A better understanding of the objects, advantages, features, properties and relationships of the subject system and method for displaying, searching, and interacting with a two dimensional, electronic version of a product catalog will be obtained from the following detailed description and accompanying drawings which set forth illustrative embodiments that are indicative of the various ways in which the principles expressed hereinafter may be employed.

BRIEF DESCRIPTION OF THE DRAWINGS

For a better understanding of the system and method for displaying, searching, and interacting with a two dimensional, electronic version of a product catalog reference may be had to preferred embodiments shown in the following drawings in which:

Figure 2:
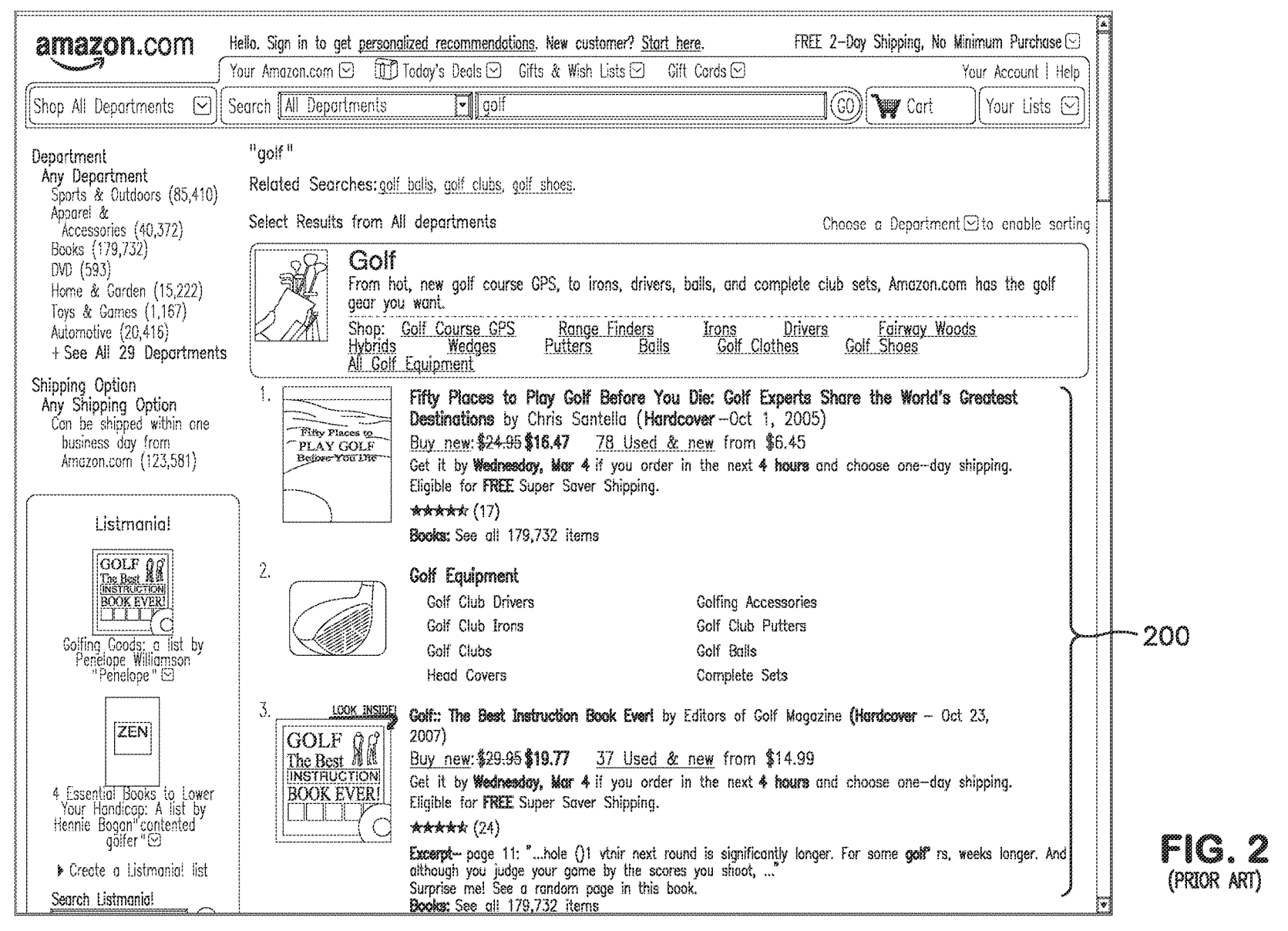
Figure 3:
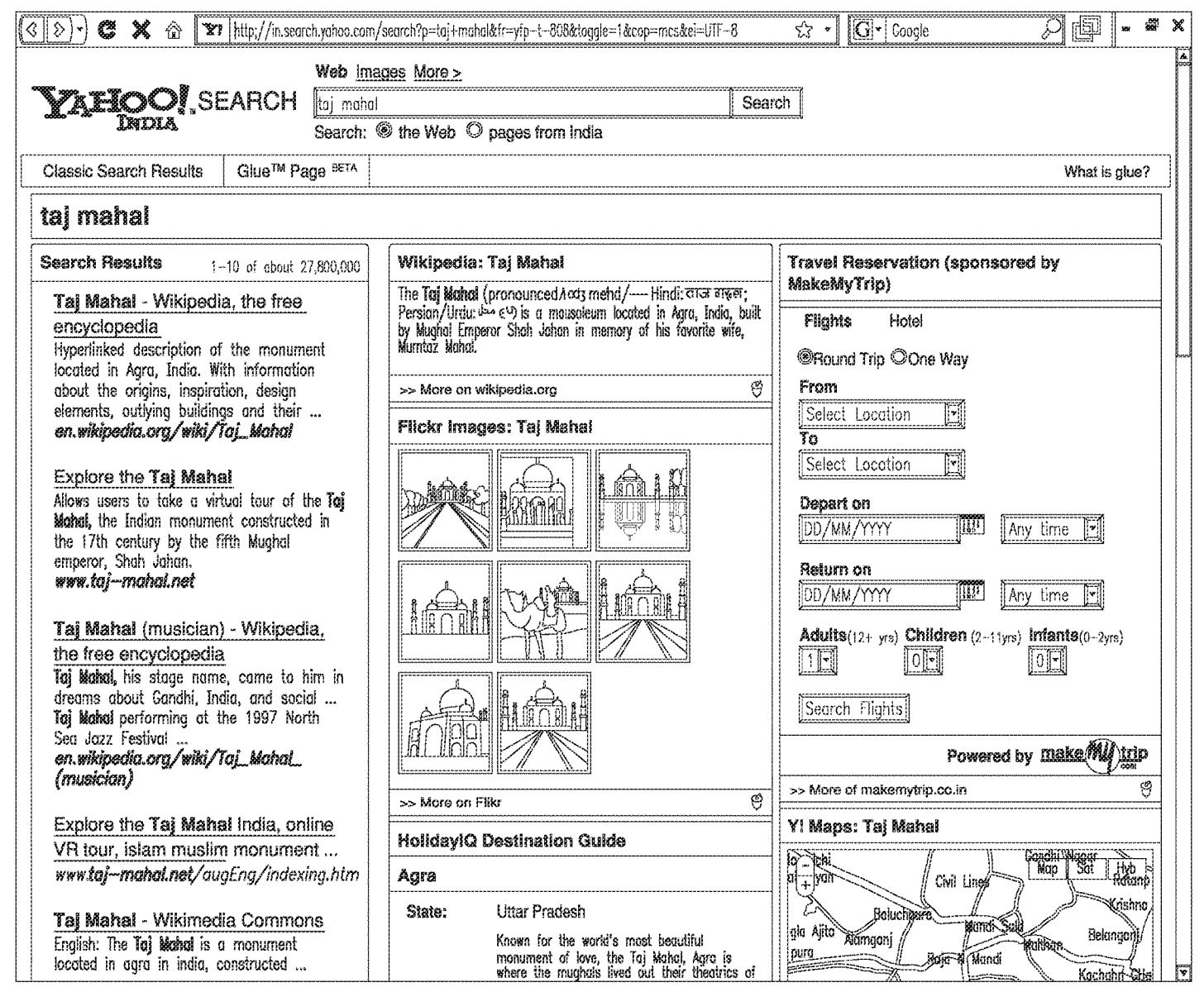
Figure 6:
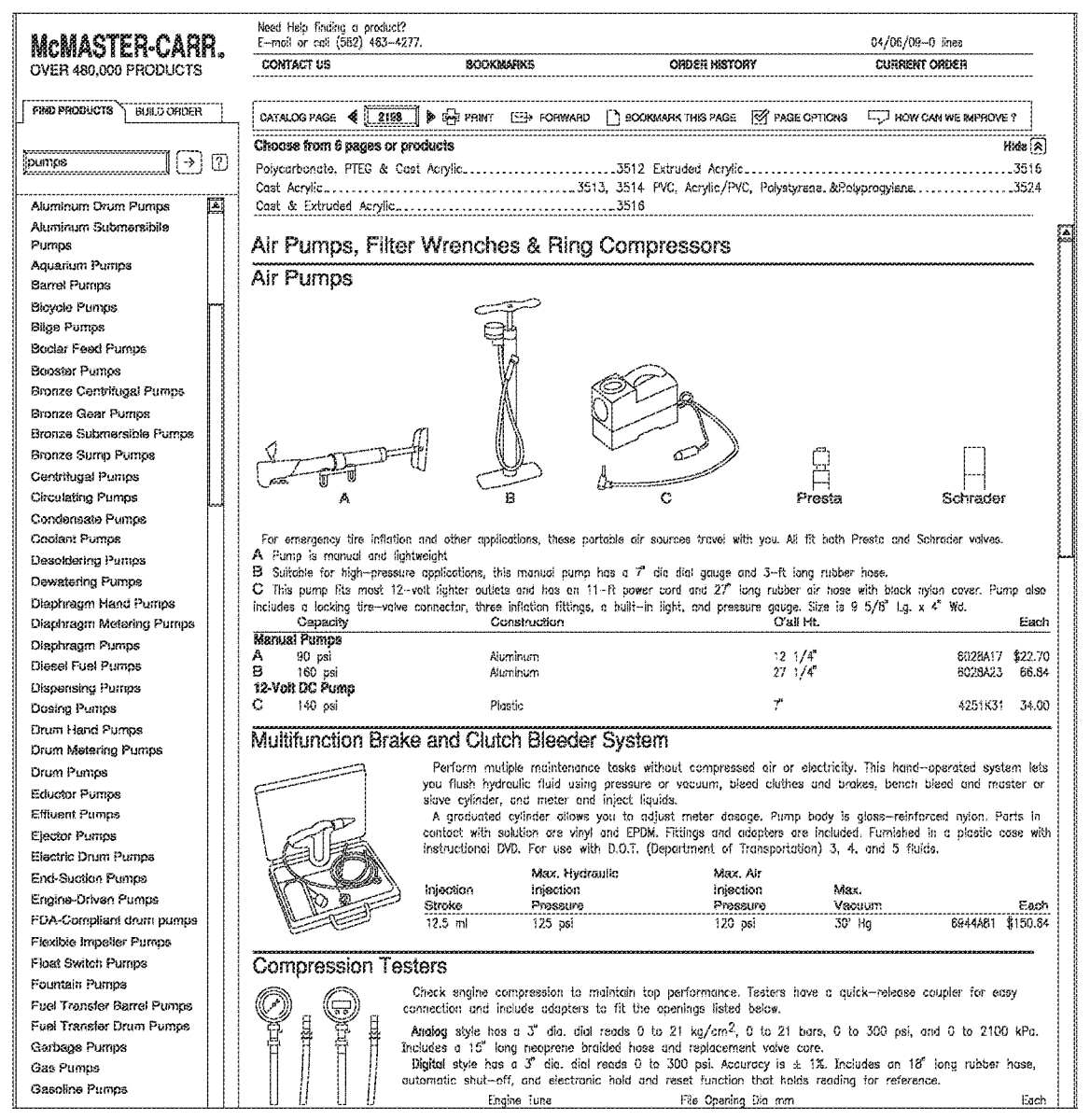

FIGS. 2-6 are screen shots illustrating prior art methods for presenting search results to a user;

FIGS. 8-18 are screen shots illustrating examples of how the catalog navigator is to be used to display, search, and interact with a two dimensional, electronic version of a product catalog; and FIG. 19 is a screen shot illustrating a prior art "item details" page.

DETAILED DESCRIPTION

Figure 1:
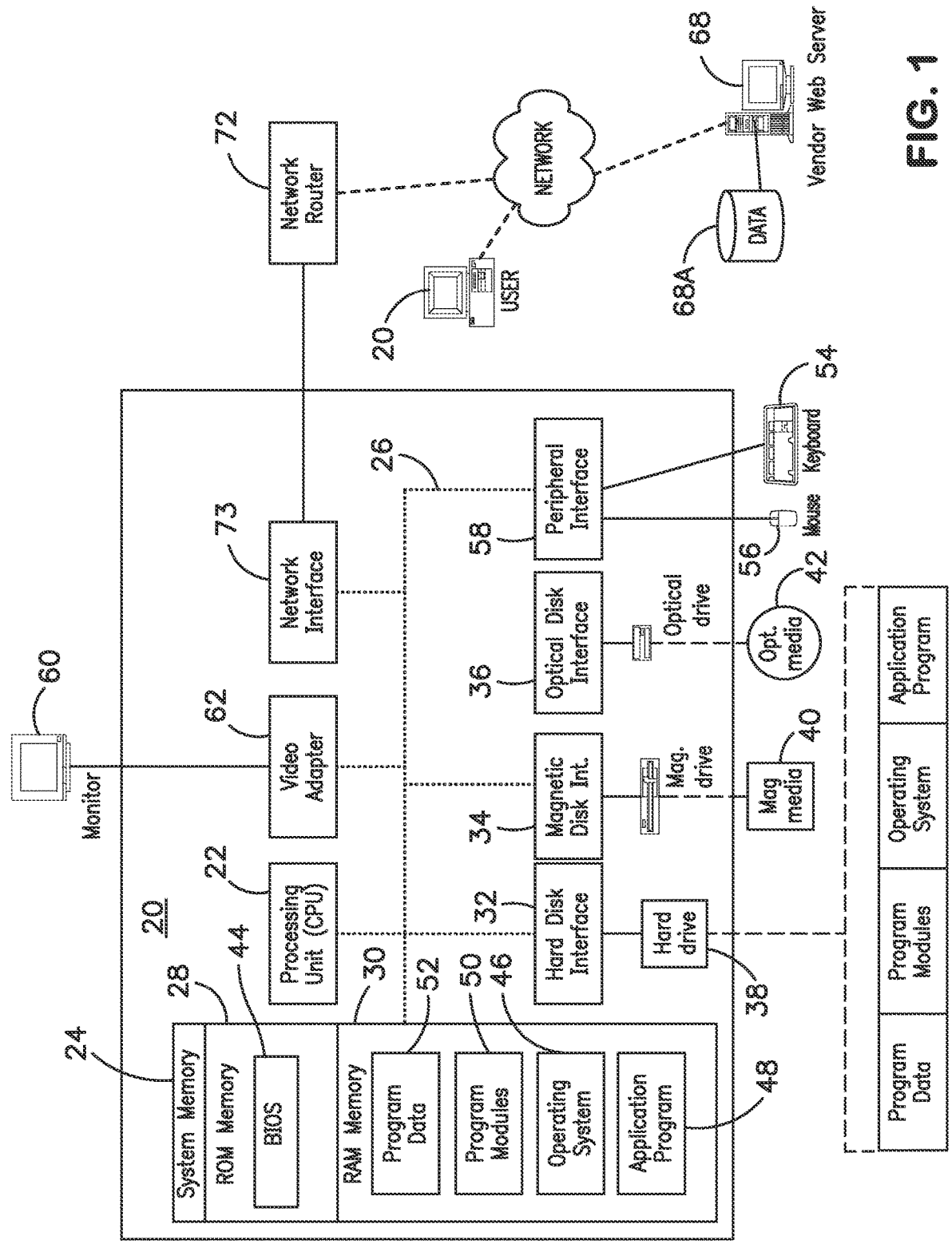
FIG. 1 is a block diagram illustrating an exemplary computer system in which the principles of the described invention may be employed.
Figure 4:
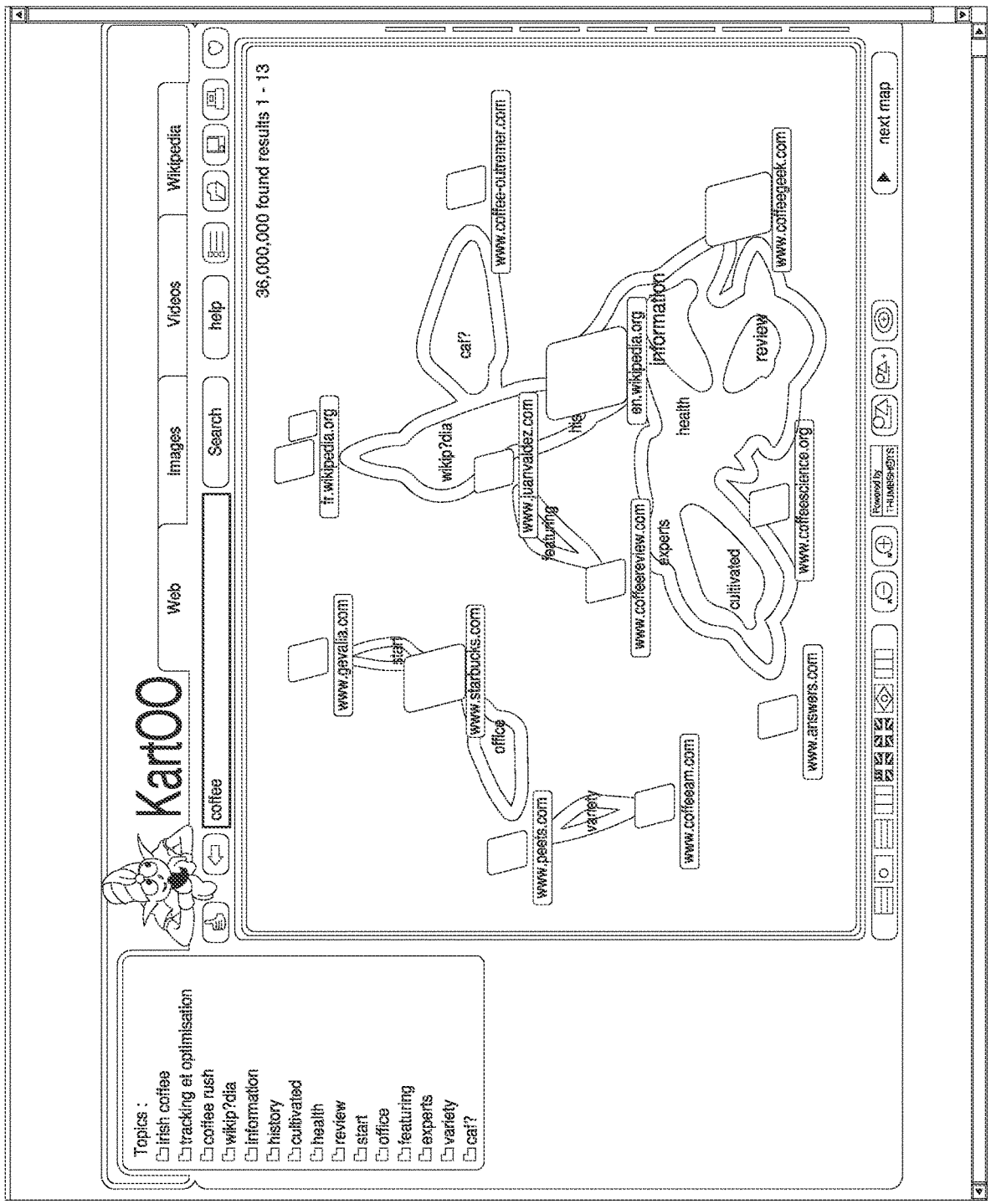
Figure 5:
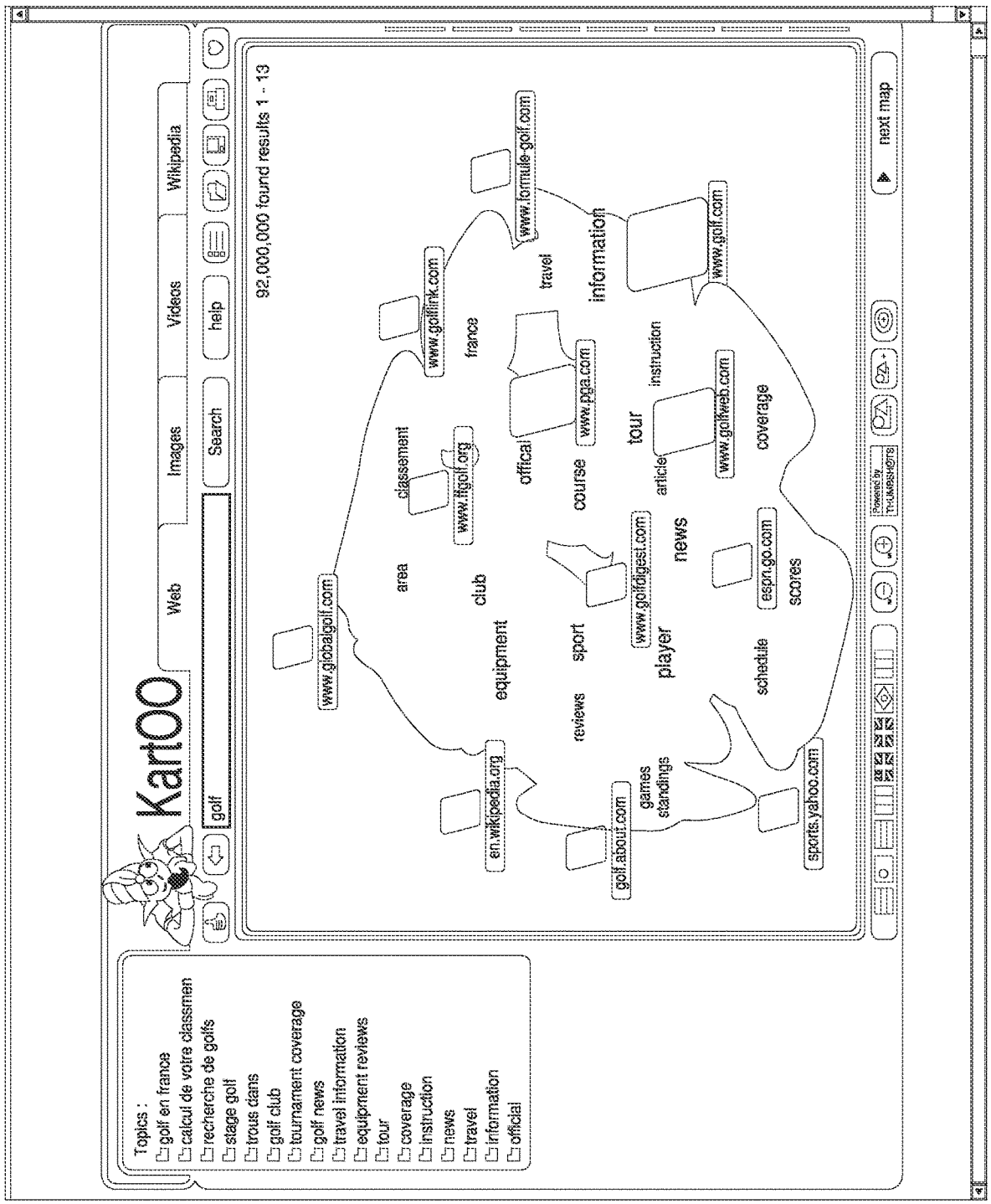

With reference to the figures, a system and method for displaying, searching, and interacting with a two dimensional, electronic version of a product catalog is hereinafter described. In particular, as illustrated in FIG. 1, the system and method will be described in the context of a plurality of processing devices linked via a network, such as the World Wide Web or the Internet. In this regard, a processing device 20, illustrated in the exemplary form of a computer system, is provided with executable instructions to, for example, provide a means for a consumer, i.e., a user, to access a vendor server 68 and, among other things, view vendor product information. Generally, the computer executable instructions reside in program modules which may include routines, programs, objects, components, data structures, etc. that perform particular tasks or implement particular abstract data types. Accordingly, those skilled in the art will appreciate that the processing device 20 may be embodied in any device having the ability to execute instructions such as, by way of example, a personal computer, mainframe computer, personal-digital assistant ("PDA"), cellular telephone, or the like. Furthermore, while described and illustrated in the context of a single processing device 20, those skilled in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example, via a network connection.

An end-user, e.g., a consumer, may enter commands and information into the processing device 20 through input devices such as a keyboard 54 and/or a pointing device 56. While not illustrated, other input devices may include a microphone, a joystick, a game pad, a scanner, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

The processing device 20 may also utilize logical connections to one or more remote processing devices, such as the vendor server 68 having associated data repository 68A. In this regard, while the remote processing device 68 has been illustrated in the exemplary form of a computer, it will be appreciated that the remote processing device 68 may, like processing device 20, be any type of device having processing capabilities. Again, it will be appreciated that the remote processing device 68 need not be implemented as a single device but may be implemented in a manner such that the tasks performed by the remote processing device 68 are distributed to a plurality of processing devices linked through a communication network.

For performing tasks as needed, the remote processing device 68 may include many or all of the elements described above relative to the processing device 20. By way of further example, the remote processing device 68 includes the executable instructions for, among other things, handling search requests (whether free-form or drill-down) and providing search results. Communications between the processing device 20 and the remote processing device 68 may be exchanged via a further processing device, such a network router 72, that is responsible for network routing. Communications with the network router 72 may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) of the remote processing device 68.

More particularly, the vendor server system 68 includes a search engine that functions to present to a user, in response to a search request received from client computer 20, search results that are intended to direct the user to one or more products that are listed within an electronic product catalog that is maintained in data repository 68A. To assist a user in finding desired products, information, or the like within the search results presented to a user in response to a search request, the vendor server system 68 provides the search results to the user utilizing a catalog navigator format that generally functions to provide the user with a means for the user to view, search, and interact with a two dimensional version of an electronic product catalog of vendor products and/or services (collectively "products"). Specifically, the catalog navigator format functions to leverage in two dimensions aspects that come from the visceral experience one would have with a paper product catalog. In this regard, because a paper product catalog has both a physical and logical context, e.g., an experienced user knows that a desired product may be found by looking for a catalog page about halfway through the catalog in a particular product category section and about a third of the way down the desired page, a paper catalog provides a visceral experience that allows a user to form a mental mapping of the information contained within the paper catalog. In a similar manner, the catalog navigator is designed to allow a user to develop a mental mapping of an online, electronic version of a product catalog.

Figure 7:
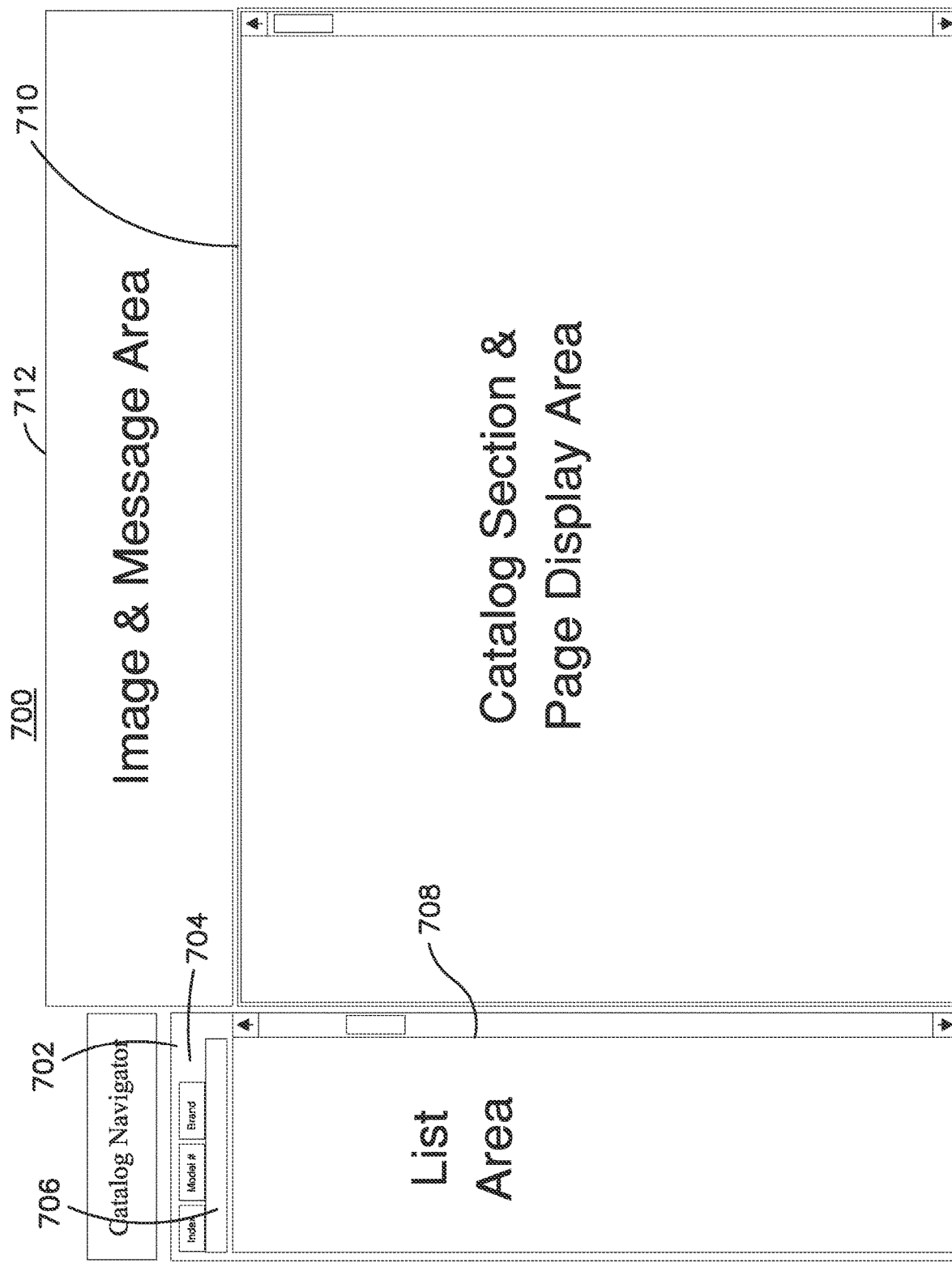
FIG. 7 is a screen shot illustrating an exemplary page for a catalog navigator by which a user displays, searches, and interacts with a two dimensional, electronic version of a product catalog.

By way of further example, FIG. 7 is a screen shot illustrating an exemplary page 700 for the catalog navigator that is to be presented to a user at client computer 20. In the illustrative example, the catalog navigator page 700 includes a tab area 702 having tabs 704 by which a user may select a type of drill-down search to perform (e.g., index search, model #search, and brand name search), a keyword input box 706 by which a user can initiate a quick traversal of a drill-down search tree or otherwise initiate the performance of a free-form search, and a list search display area 708 in which an appropriate drill down search listing can be presented to a user using, without limitation, an expandable, tree structure format. In addition, the catalog navigator page 700 includes a catalog page display area 710 which is utilized to present to a user iconic images of one or more catalog page(s) from the electronic catalog, which pages at various times may be highlighted to emphasize that the pages include product(s) that are responsive to a search request provided by the user via the catalog navigator and received by and processed by the search engine of the vendor server 68. As will be described in greater detail below, the iconic images, presented using a two dimensional format, can be organized into user recognizable, logical groupings, e.g., "HVAC" products, "Power Tool" products, automotive products, "home and garden" products, etc., and the catalog page(s) represented by or linked to by the iconic images can be images of actual pages from a corresponding paper catalog and/or dynamically generated catalog pages. It will also be understood that a catalog page can be included in more than one logical group. Finally, the catalog navigator page also includes an area 712 where links to catalog pages (or links that can be used to help refine search results), iconic images of products, and/or other information can be displayed to a user such as, for example, links to or iconic images of catalog pages that correspond to the most popular catalog pages (e.g., as determined based upon an analysis of images of past user behaviors) for the current state of the search results.

Figure 8:
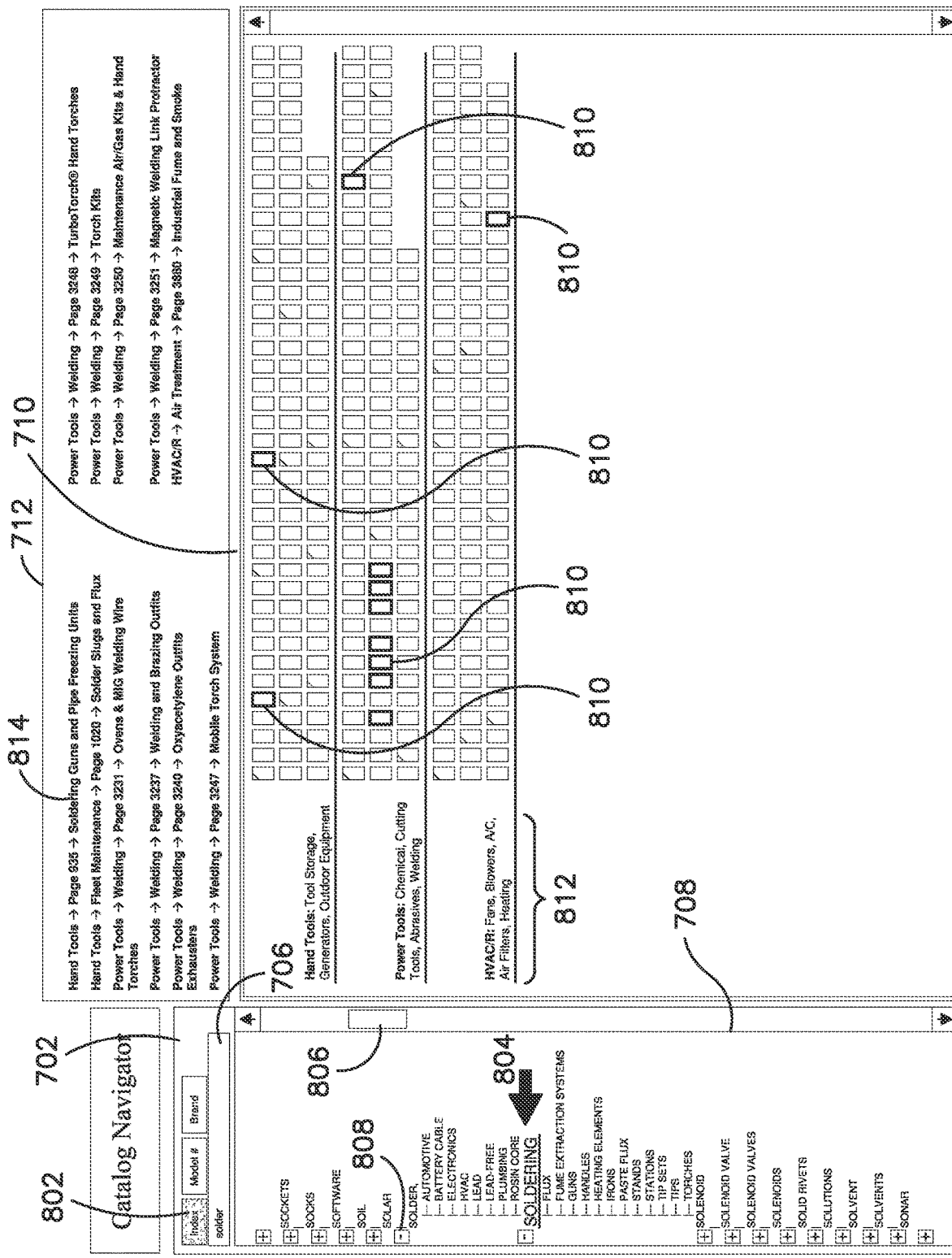

Turning now to FIGS. 8-18, examples of how the catalog navigator is to be used to display, search, and interact with a two dimensional, electronic version of a product catalog will now be described. Considering first FIG. 8, illustrated is an example in which a user has selected the "Index" tab 802 in the tab area 702 and entered the search term "solder" in the free-form search area 706. In response to these inputs, the system presents to the user a corresponding "Index" drill-down search tree 804 in the listing area 708 wherein the "Index" drill-down search tree 804 is further presented in an expanded fashion to emphasize particular drill-down search terms associated with the entered search term "solder." While in this example a free-form search term was employed by the user to quickly move to the "solder" section of the "Index" drill-down search tree 804, it will be appreciated that the user could have equally navigated the "Index" drill-down search tree 804, for example by using the provided scroll bar 806 and expanding the tree via interaction with the appropriate icon(s) 808, to arrive at the same search state.

In addition to presenting the user with the "Index" drill-down search tree 804, the system presents to the user in the catalog page display area 710 links (in the form of activatable iconic images, text, etc.) to pages of the electronic product catalog stored in database 68A wherein those activatable icons corresponding to catalog pages that have one or more products that are matched to the term "solder" are highlighted for the user as shown by the example icons 810 in FIG. 8. As noted above, in the illustrative example, the catalog icons are arranged within the catalog page display area 710 in category sections and the category sections are provided with category headings 812 for ease of user reference. In addition, the catalog icons are arranged in an order that reflects a page numbering order, e.g., the lowest page number is positioned first in a section with the highest page number being positioned last in a section. Furthermore, while the electronic catalog may have catalog pages in multiple, different categories or product classifications, in the illustrative example only the catalog sections that have pages that are matched to the search term are displayed to the user in the catalog page display area 710. As additionally noted above, in the area 712 textual or descriptive links 814 are presented to the user which are activatable to take the user to catalog pages and/or other information that has been matched to the user's search request. In this example, the descriptive links 814 provide a textual description of the catalog pages corresponding to the catalog pages linked to by the iconic images 810 that are highlighted in the catalog page display area 710.

Figure 9:
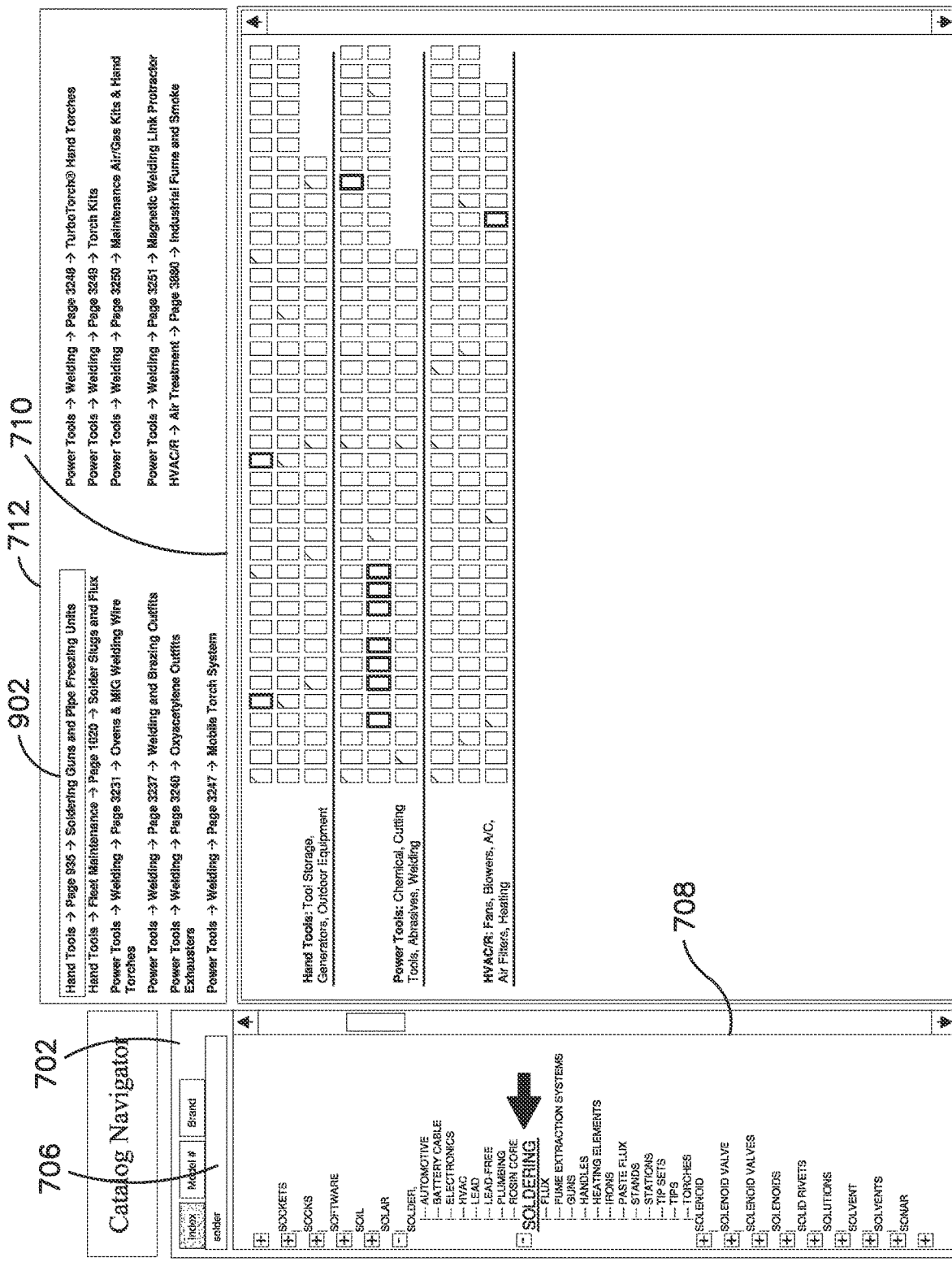
Figure 10:
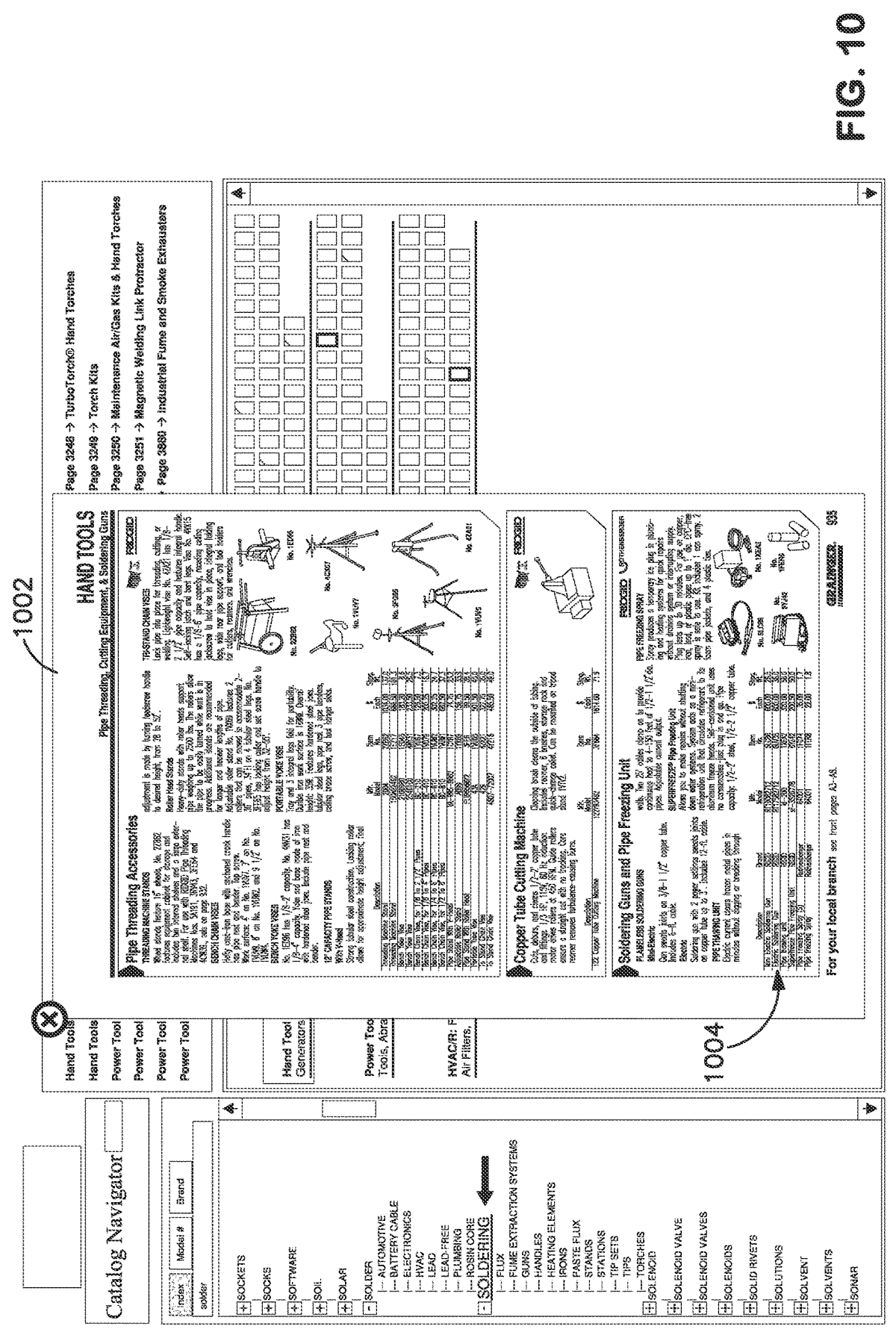

Turning now to FIGS. 9 and 10, FIG. 9 illustrates an example wherein a user, having performed an initial search, activates a link in the area 712, particularly the link 902 which describes "Hand Tools→Page 935→Soldering Guns and Pipe Freezing Units." In response to activation of this link by the user (which activation is communicated to and acted upon by the server 68), the system causes the display of the catalog page 1002 corresponding to the link that was activated as is illustrated in FIG. 10. The single catalog page 1002 that is displayed in this example is a ".pdf" image that is presented to the user in a pop-up window the lies over the catalog navigator page 700. As seen, the catalog page 1002 includes products 1004 offered for sale by the vendor that meet the terms of the search request, i.e., "solder," provided to the system by the user. It will also be appreciated that additional manners of presenting the requested catalog page 1002 to the user in response to activation of the corresponding link 902 are also contemplated and the example illustrated in FIG. 10 is not intended to be limiting, e.g., the image can be presented utilizing any known imaging format.

Figure 11:
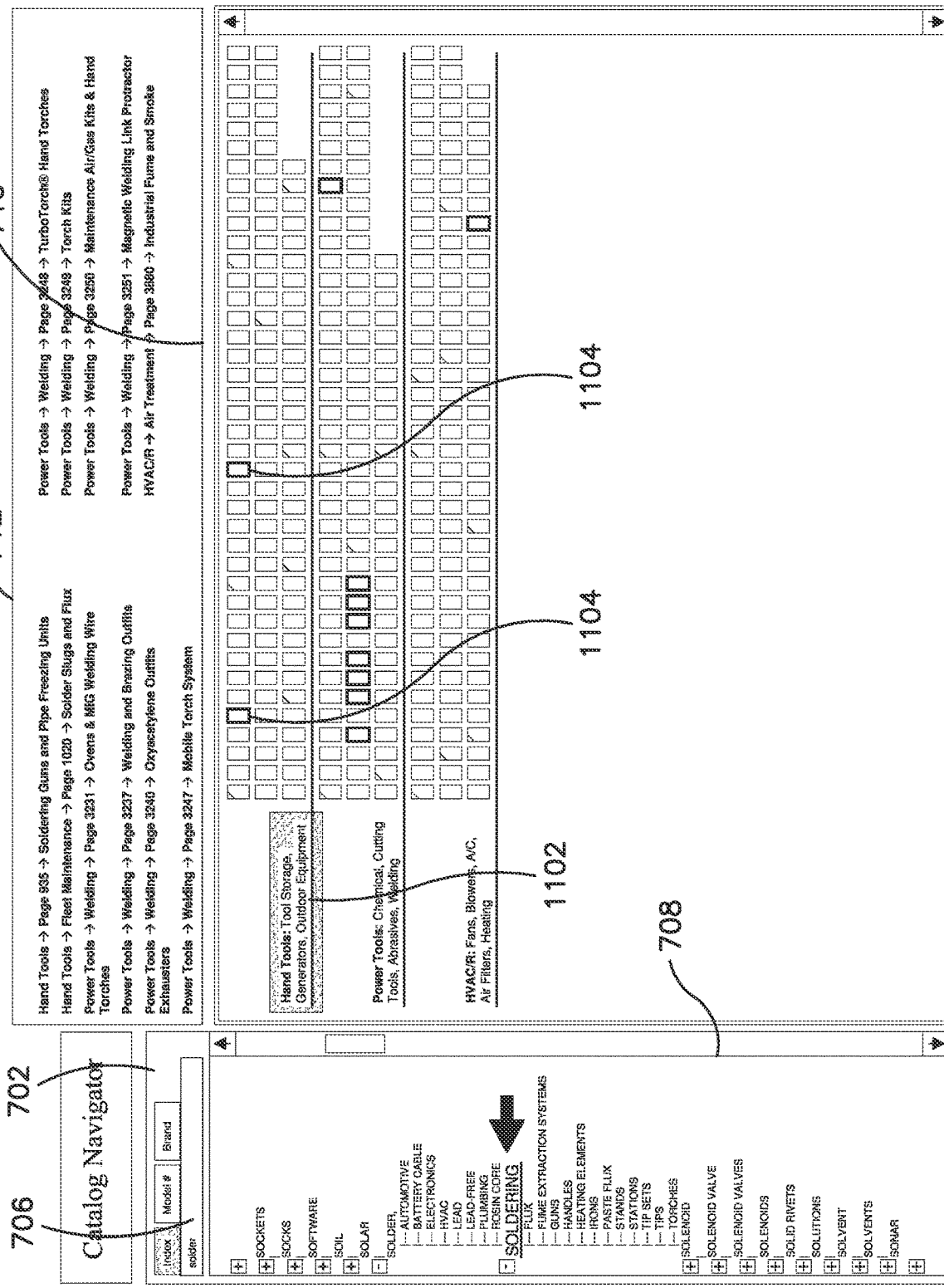
Figure 12:
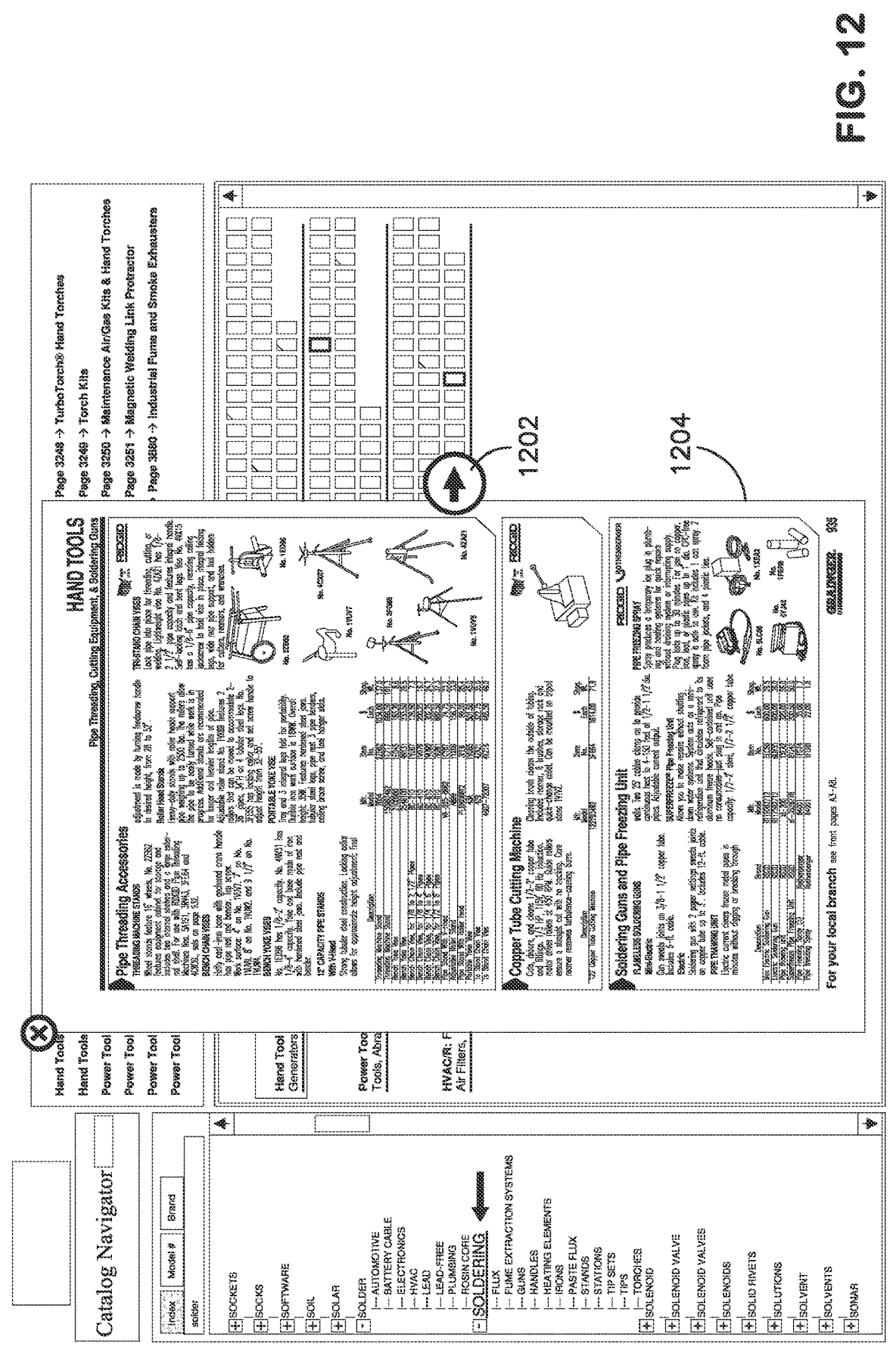
Figure 13:
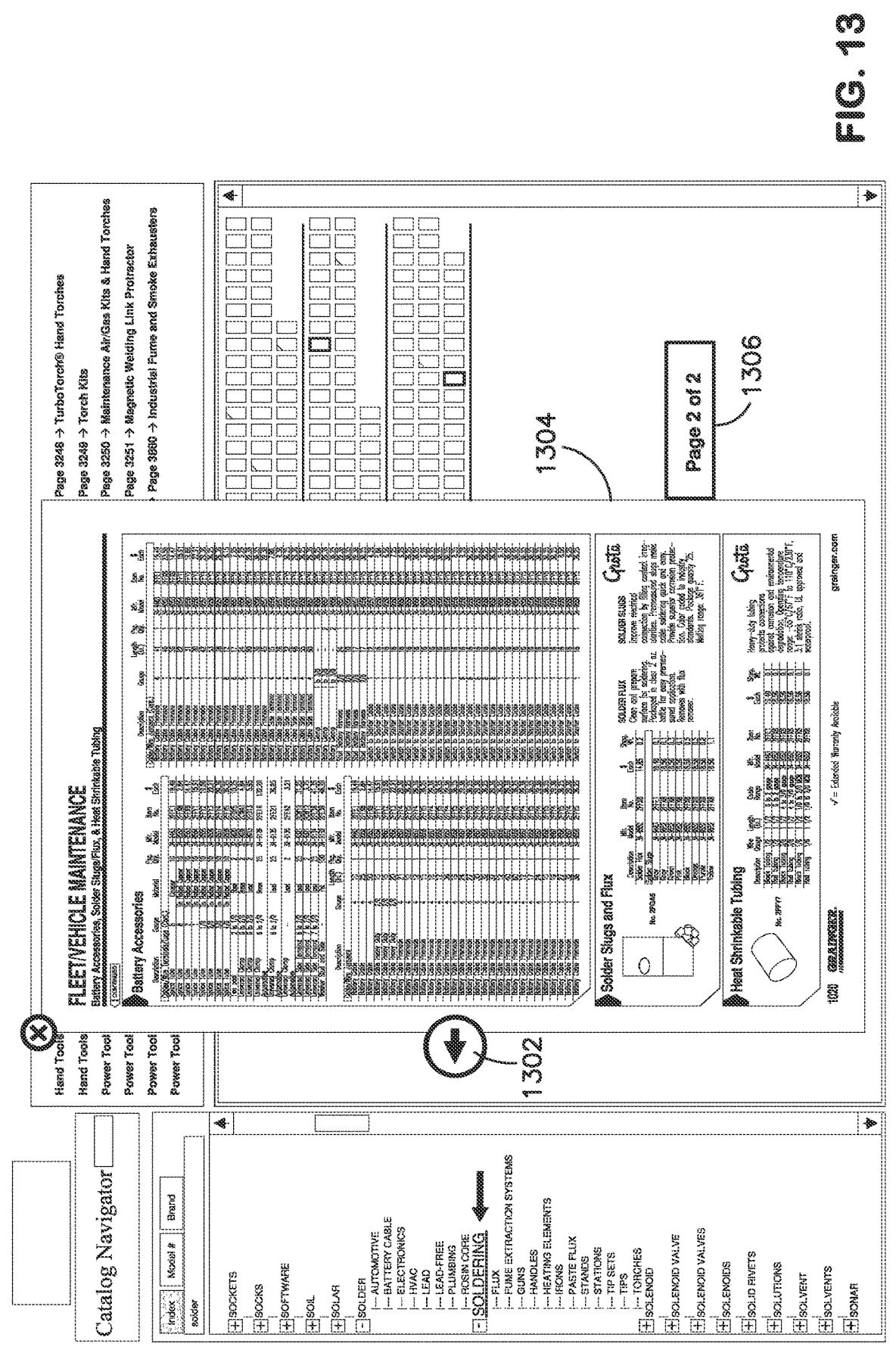

Turning now to FIGS. 11-13, FIG. 11 illustrates an example wherein a user, having performed an initial search, activates a category section link in the catalog page display area 710, particularly the category section link 1102 which describes the product category and subcategories "Hand Tools: Tool Storage, Generators, Outdoor Equipment." In response to activation of this link by the user (which activation is communicated to and acted upon by the server 68), the system causes the display of a set of catalog pages, particularly the catalog pages corresponding to the iconic images of the catalog pages that are highlighted 1104 in the selected category section of the catalog page display area 710. As illustrated in FIGS. 12 and 13, each catalog page in the set of catalog pages return by the system can be displayed individually while icons are provided to allow the user to easily navigate (e.g., back 1302, forward 1202, start of the set, end of the set) between the catalog pages within the returned catalog page set. A notation 1306 may also be provided to allow the user to discern which page of the set the user is currently viewing. The catalog pages 1204 and 1304 that are displayed in this example are ".pdf" images (or images of any other known imaging format) that are presented to the user in a pop-up window the lies over the catalog navigator page 700. Again, the catalog pages 1204 and 1304 include products offered for sale by the vendor that meet the terms of the search request, i.e., "solder," provided to the system by the user. It will also be appreciated that additional manners of presenting the requested catalog page sets to the user in response to activation of the corresponding link 1102 are also contemplated and the example illustrated in FIGS. 12 and 13 is not intended to be limiting. Additionally, it is to be appreciated that the pages in a set of catalog pages returned to a user in response to an activation of a link do not have to be contiguous but can be contiguous and can include non-highlighted pages, for example at the discretion/selection of the user which may include a designation of a number of pages to include, to provide page context to the user. Still further, it is to be understood that a set of catalog pages returned to a user in response to an activation of a link do not have to be restricted to a particular category or section of the electronic catalog and, in fact, the electronic catalog can be implemented without category sections and need not be arranged so as to correspond to a format given to an analogous paper catalog.

While in the example illustrated in FIGS. 12 and 13 the user is presented with a catalog page set comprised of two catalog pages, it will be appreciated that, had the user clicked on the link which describes the product category and subcategories "Power Tools: Chemical, Cutting Tools, Abrasives, Welding" in the catalog page display area 710 a set of eight catalog pages would have been returned to the user, i.e., the eight catalog pages corresponding to the eight catalog pages highlighted within the "Power Tools" category section of the catalog pages displayed in the catalog page display area 710. Also note that the user has the ability to click directly upon any of the icons 1104 linked to individual catalog pages in which case only that catalog page corresponding to the activated link(s) will be expanded and shown to the user. As will also be understood, the presented catalog pages can themselves have links on which customers can click to thereby obtain still further product information.

Figure 14:
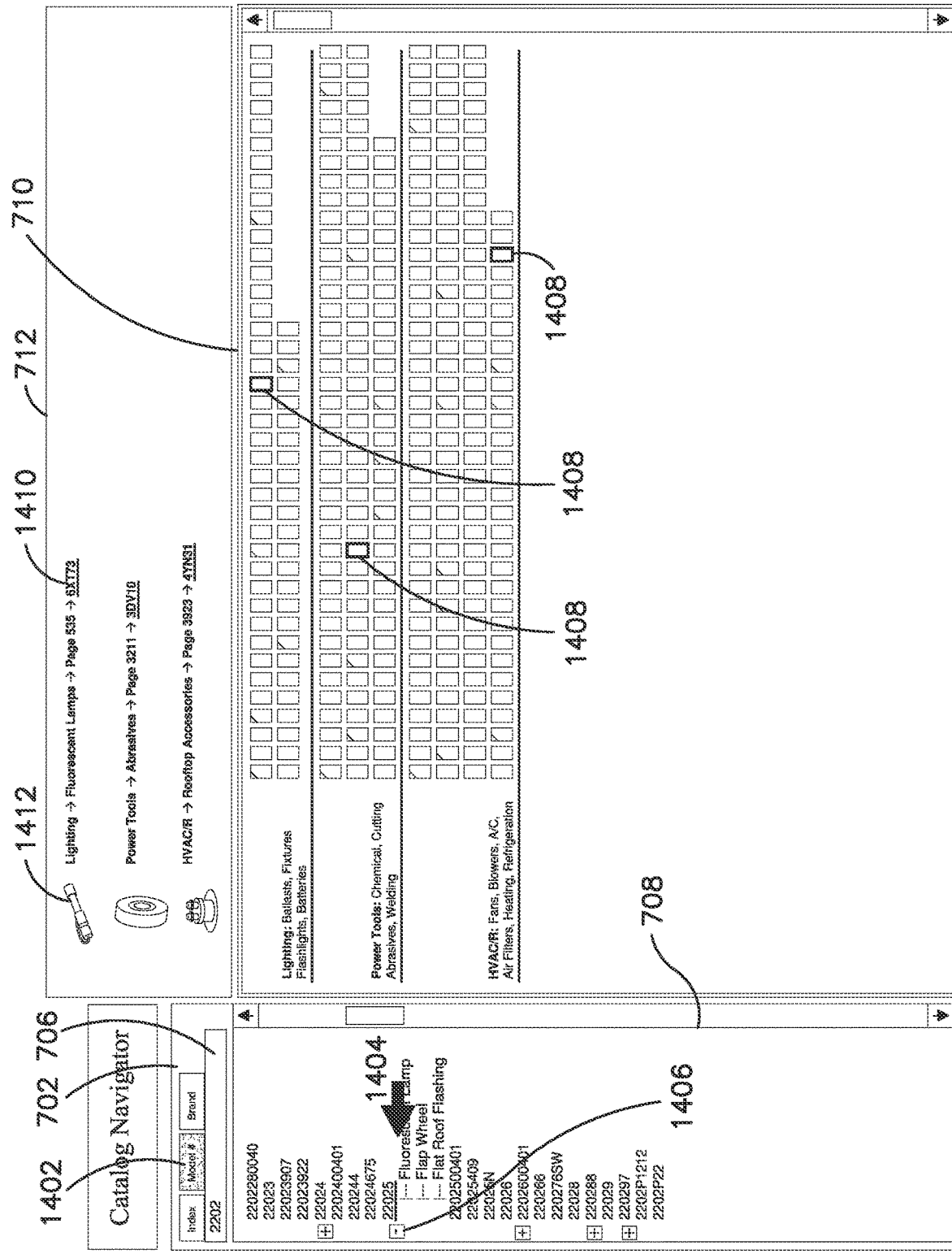
Figure 19:
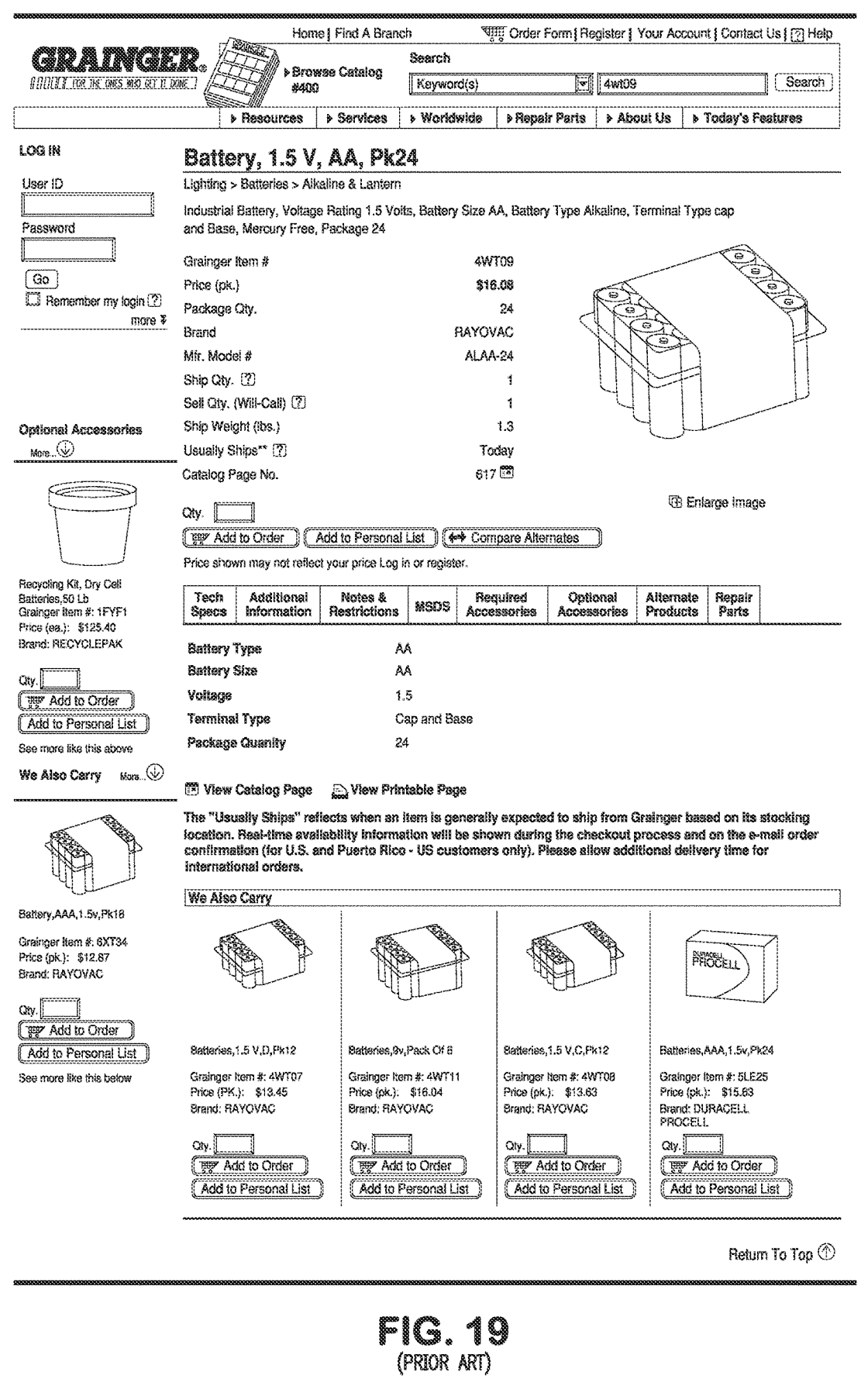

Turning now to FIG. 14, FIG. 14 illustrates an example in which a user has selected the "Model #" tab 1402 in the tab area 702 and entered the search term "2202" in the free-form search area 706. In response to these inputs, the system presents to the user a corresponding "Model #" drill-down search tree 1404 in the listing area 708 with the drill-down search tree listing starting at and focused on "Model #s" starting with the provided "2202." FIG. 14 also shows that the user has expanded the tree location that corresponds to model # "22025" via activation of the icon 1406. Underneath the entry for "22025" there is illustrated three product descriptions/links and the user can select one of the product descriptions or the parent node/link of "22025" to obtain additional information as desired. In the instance where the user clicks upon the parent node/link of "22025," the catalog page display area 710 will be caused to present to the user the catalog sections and catalog pages wherein one or more of the catalog pages within the presented catalog sections has one or more products that match the activated link/search term "22025." As before, the icons of the specific catalog pages that do have one or more products that match the activated link/search term "22025" are highlighted, as shown by the example icons 1408. As noted above, the icons 1408 (as well as any other displayed catalog page image icon) can be activated to cause the presentation of the image of the corresponding catalog page. In this further example, the area 712 is caused to display descriptive links 1410 and/or representative product images 1412 (which may also serve as a link) for the products or groups of products that match the activated link/search term "22025." It is to be understood that, in the case of a model #search a user is typically looking for a product and not a group of products and, as such, the links 1410 presented in the area 712 are preferably selected so as to direct a user to product specific information. Product specific information that is to be returned to a user in response to activation of a link 1410 may be in the form of a catalog page on which the product is listed but is more desirably in the form of an otherwise conventional "Item Detail" page as shown in prior art FIG. 19.

Figure 15:
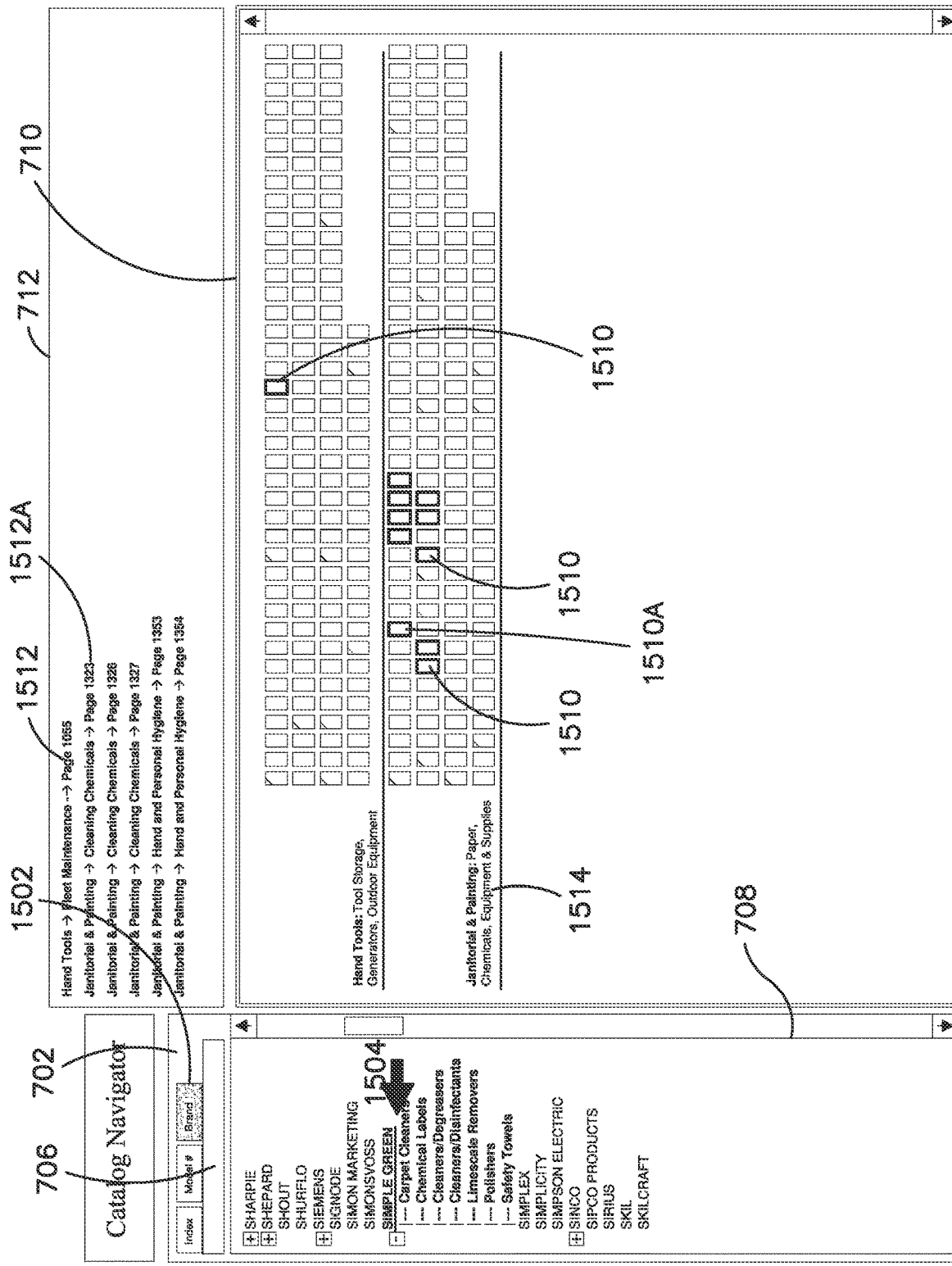

Turning now to FIG. 15, FIG. 15 illustrates an example in which a user has selected the "Brand" tab 1502 in the tab area 702. In response to this input, the system presents to the user a corresponding "Brand" drill-down search tree 1504 in the listing area 708. To navigate the "Brand" drill-down search tree 1504, the user can enter a term into the search term field 706 and/or use the scroll/expand icons as discussed above. Considering the case where the user has navigated to and selected the "Simple Green" brand link within the "Brand" drill-down search tree 1504, the system responds by causing the catalog page display area 710 to present activatable icons, i.e., image links, to pages of the electronic product catalog stored in database 68A wherein those activatable icons corresponding to catalog pages that have one or more products that are matched to the term "Simple Green" are highlighted for the user as shown by the example icons 1510 in FIG. 15. As before, although not required, the catalog icons are arranged within the catalog page display area 710 in category sections and the category sections are provided with category headings 1514 for ease of user reference and selection. In the area 712 textual or descriptive links 1512 are presented to the user which are activatable to take the user to catalog pages and/or other information that has been matched to the user's search request. In this example, the descriptive links 1512 correspond to and provide a textual description of the iconic images 1510 that are highlighted in the catalog page display area 710, e.g., activation of link 1512A and 1510A would result in the same catalog page being presented to a user. The manner of interacting with these displayed elements is as described above with reference to FIGS. 8-14.

Figure 16:
Figure 17:
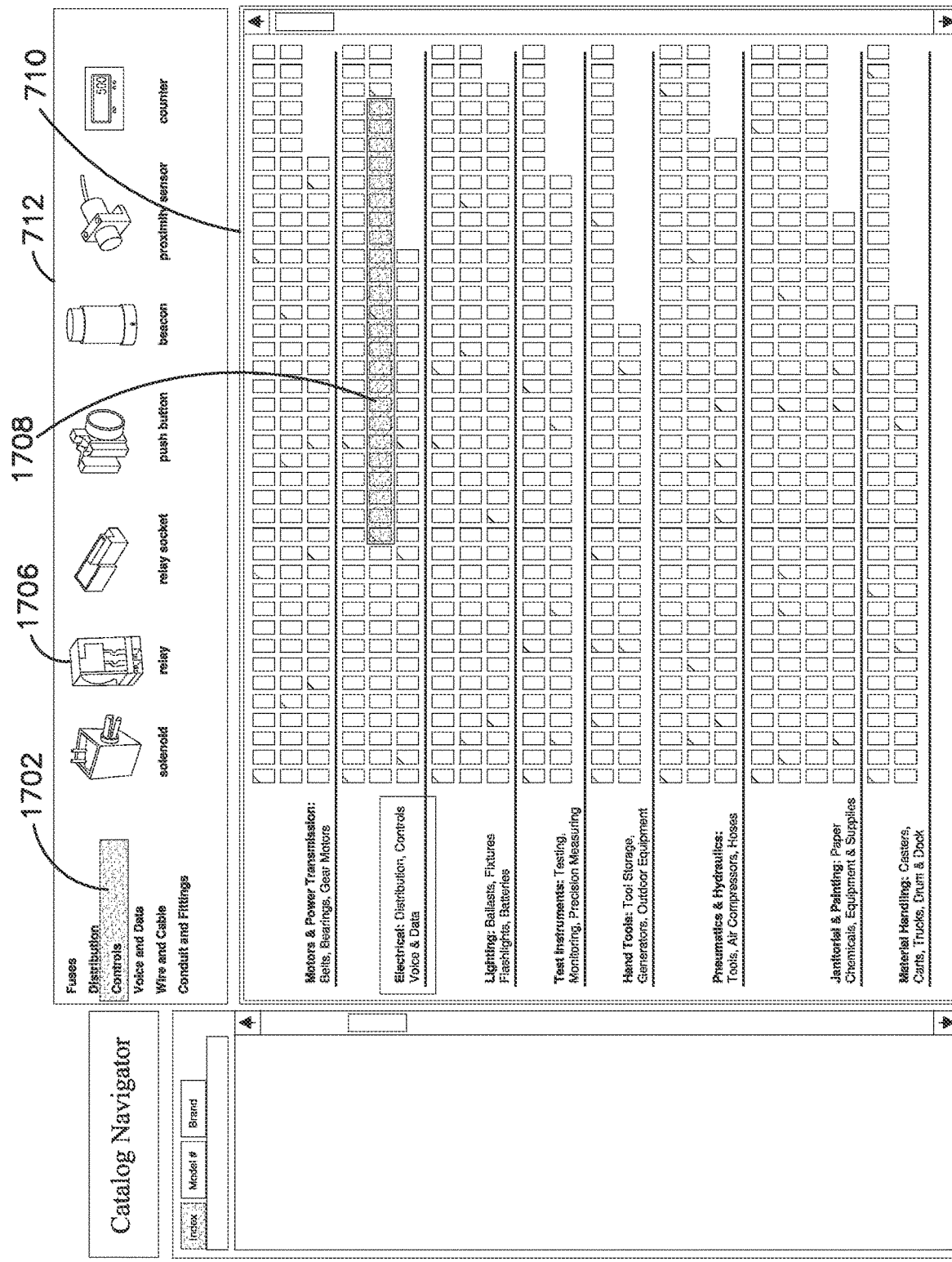

Turning now to FIG. 16, illustrated is an exemplary screen shot wherein the catalog page display area 710 is presenting the user with iconic images of all of the catalog pages that comprise the electronic catalog. In this illustrative example, the iconic images are again organized into categories or sections. The display of iconic images for the entirety of the online catalog as shown in FIG. 16 can occur upon the start of the catalog navigator and, in such a case, would precede the screen shots shown in FIGS. 8-15, i.e., interaction with the tabs, etc. would cause the icon images to be pared down to the relevant categories as described above. Alternatively, the catalog page display area 710 can be initially empty of icons and thereafter populated in the manners described above with a further link being provided for the user to request, at any desired time, the full catalog view as shown in FIG. 16. Still further, the user may be provided with the ability to toggle between a screen such as shown in FIG. 16 in which pages are not highlighted and those discussed above wherein pages are highlighted. Even further, the user may be provided with a means to toggle between views and/or filter displayed pages according to prior purchasing history (e.g., include in the presentation only catalog pages having previously purchased items by the user or a group to which the user belongs), etc. As additionally shown in FIG. 16, upon a user selecting a catalog category link, e.g., "Electrical" category link 1602, the system may cause links 1604 relevant to the catalog pages in that category link to be presented to the user in area 712, e.g., product type links. In this manner, a user may select one of the links 1604, e.g., the "Controls" link 1702 as shown in FIG. 17, whereupon the icons of the specific catalog pages that have one or more products that match the activated link/search term are highlighted, as shown by the example icons 1708. The highlighting may, as illustrated in FIG. 17, be used to show a block of catalog pages and, in such a case, a user can select any page within the highlighted block to cause the system to present the set of highlighted pages in the manner described previously in connection with FIGS. 12 and 13. It is also contemplated that, upon a user selecting a catalog category link, e.g., "Electrical" category link 1602, the system could present to the user a set of all of the catalog pages that are within the selected category again in the manner described in connection with FIGS. 12 and 13. In addition, after selecting the link 1702, images 1706 of representative products (which may be used as links to sets of catalog pages as described above) with the selected category may similarly be presented within the area 712.

Figure 18:
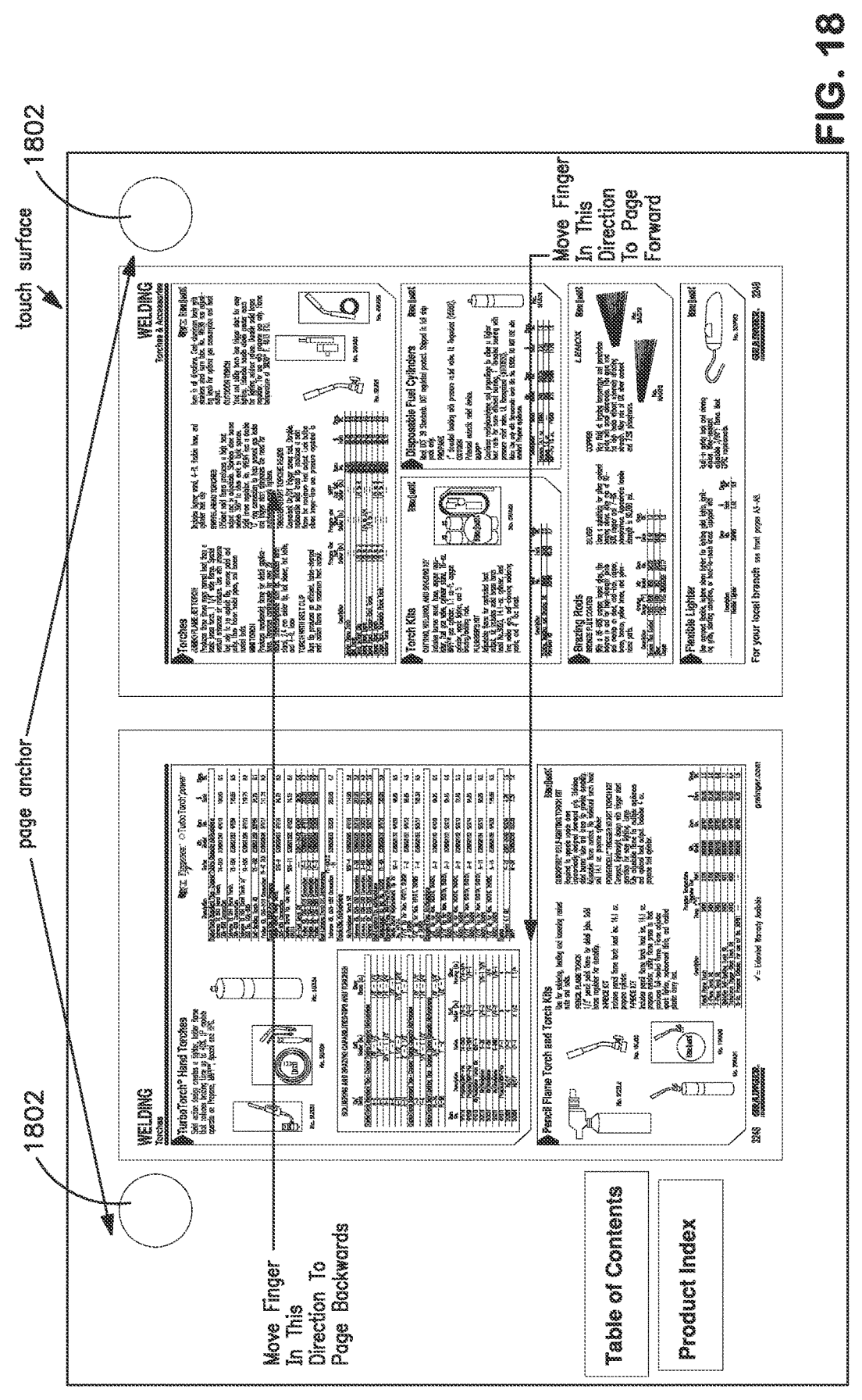

While the navigation example illustrated in FIGS. 12 and 13 provided links to thereby provide the system with forward, back, etc. commands, FIG. 18 illustrates an alternative method for use in navigating a set of pages by a user making sliding gestures on each page to simulate the turning of pages (in either direction). In such a case, it will be understood that the display device associated with the client device would have touch screen capabilities. In such a system, other elements from a paper catalog can also be presented to a user in the display to thereby aid in navigation (e.g., a means to access a catalog index and/or table of contents which would also include links that can be selected with a finger).

Appreciating that one aspect of a paper catalog that is appealing to a user is the ability to place one's finger on a page and keep turning pages to thereby "bookmark" pages of interest, the system may further provide a means by which this action can be simulated. By way of example illustrated in FIG. 18, to simulate this action on a touch surface, the user can tap a Page Anchor area 1802 on the screen and this action will be interpreted by the system as corresponding to the placement of a finger on a page. The user can then flip pages in either direction by using, for example, the aforementioned swiping motions and, when the user stops turning pages the user can return to the "bookmarked" pages by means of another gesture, such as by double tapping on the Page Anchor 1802. Double tapping a Page Anchor 1802 yet again may be used to return the user to the last page the user viewed before the first double-tap. A new bookmark can be set at any time by making a single tap on the Page Anchor.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof.

What is claimed is:

1. A non-transitory computer readable media having stored thereon computer executable instructions for use in presenting information relevant to a product catalog, the instructions performing steps comprising:
    presenting to a user via use of a client device in a two-dimensional format, having an overall visual appearance, a plurality of links, each of the plurality of links having an original visual appearance and being a link to a page of a product catalog on which is listed a plurality of products;
    receiving a search request via use of the client device while the plurality of links are being presented to the user;
    in response to the search request, causing the client device to retrieve from a server device having an associated search engine a set of product catalog pages wherein each product catalog page within the retrieved set of product catalog pages has at least one product that is determined by the search engine to be responsive to the search request;
    using the retrieved set of product catalog pages to modify the overall visual appearance of the two-dimensional format of the plurality of links that is being presented to the user such that the original visual appearance of select links within the presented plurality of links are visually altered while the original visual appearance of remaining ones of the plurality of links are unaltered;
    receiving a selection of a one of the plurality of visually altered links via use of the client device;
    in the response to the selection, selecting from a memory of the client device a one of the product catalog pages within the retrieved set of product catalog pages that is linked to the selected one of the plurality of visually altered links; and
    presenting to the user via use of the client device the selected one of the product catalog pages within the retrieved set of product catalog pages.

2. The non-transitory computer readable media as recited in claim 1, wherein each of the plurality of links comprises an icon image representative of a product catalog page of the product catalog.

3. The non-transitory computer readable media as recited in claim 2, wherein the search request is formed via interaction with a drill-down search tree provided to the user via use of the client device.

4. The non-transitory computer readable media as recited in claim 2, wherein a plurality of icon images each representative of a product catalog page of a product catalog are presented to the user in organized categories within the two-dimensional format.

5. The non-transitory computer readable media as recited in claim 4, wherein one or more activatable labels are used to present the organized categories within the two-dimensional format.

6. The non-transitory computer readable media as recited in claim 2, wherein the search request is formed via text entry in a text entry field provided to the user via use of the client device.

7. The non-transitory computer readable media as recited in claim 2, wherein the instructions concurrently present to the user via use of the client device one or more product images each being representative of a product found on the product catalog pages of the product catalog that correspond to each of the visually altered, icon images.

8. The non-transitory computer readable media as recited in claim 2, wherein at least one product catalog page in the retrieved set of product catalog pages includes at least one product not responsive to the search request.

\* \* \* \* \*